United States Patent [19]

Shibukawa et al.

[11] Patent Number: 4,503,823
[45] Date of Patent: Mar. 12, 1985

[54] IGNITION TIMING CONTROL APPARATUS FOR INTERNAL COMBUSTION ENGINE

[75] Inventors: Suetaro Shibukawa; Hiroshi Katada, both of Katsuta, Japan

[73] Assignee: Hitachi, Ltd., Tokyo, Japan

[21] Appl. No.: 418,255

[22] Filed: Sep. 15, 1982

[30] Foreign Application Priority Data

Sep. 18, 1981 [JP] Japan .................. 56-146135

[51] Int. Cl.³ ................................... F02P 5/04
[52] U.S. Cl. ................................ 123/418; 123/415
[58] Field of Search ........................ 123/418, 415

[56] References Cited

U.S. PATENT DOCUMENTS

| | | | |
|---|---|---|---|
| 4,066,968 | 1/1978 | Guipaud | 123/418 |
| 4,079,709 | 3/1978 | Schuette | 123/418 |
| 4,104,997 | 8/1978 | Padgitt | 123/418 |
| 4,284,046 | 8/1981 | Hashimoto | 123/418 |

Primary Examiner—Ronald B. Cox
Attorney, Agent, or Firm—Antonelli, Terry & Wands

[57] ABSTRACT

An ignition timing control circuit for internal combustion engine comprising a pulse generator which provides a pair of pulses in synchronization with the crank shaft rotation, a pair of polygonal wave generators for providing two types of polygonal waves, one having a constant amplitude, the other having a peak level which varies depending on the engine speed, and a comparator which detects the point of time at which the two waves have the same level and provides an ignition signal at this point, whereby the timing of ignition can be varied automatically, based on the engine speed.

5 Claims, 6 Drawing Figures

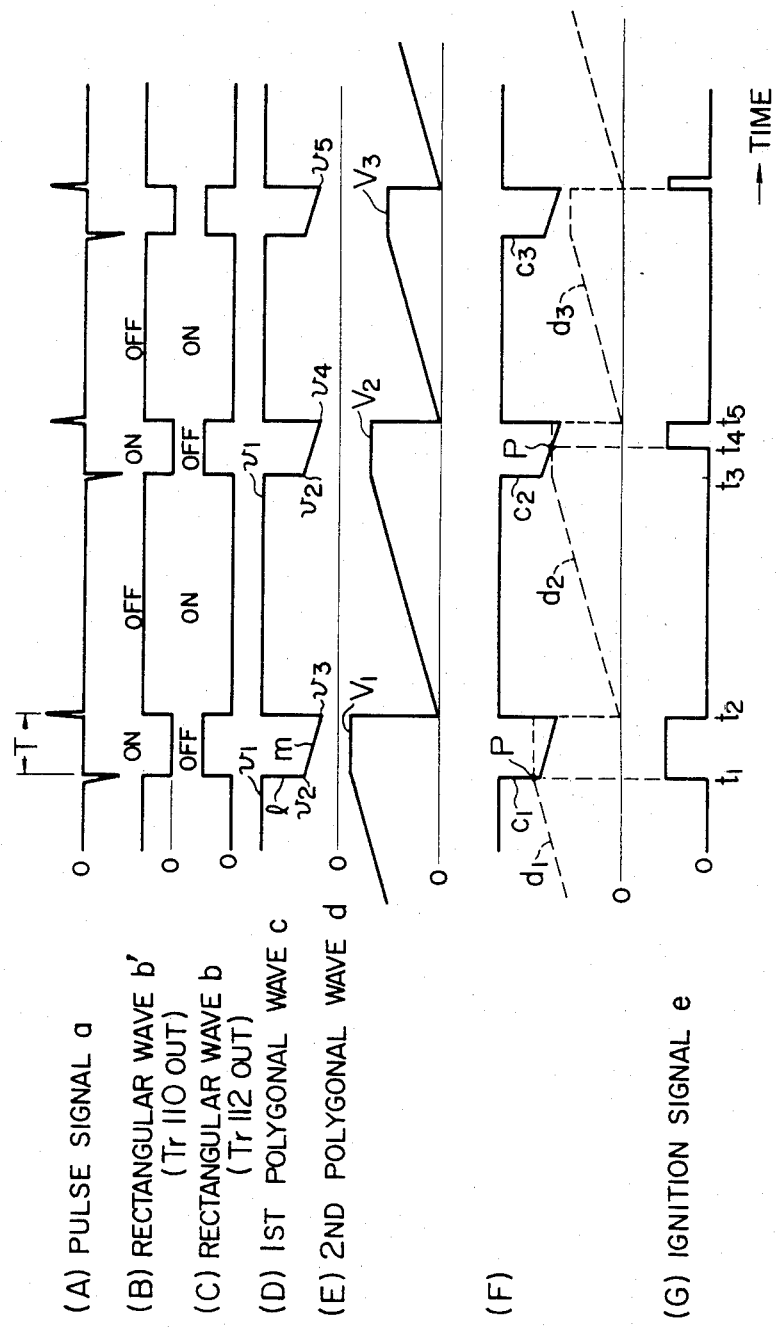

IGNITION TIMING CONTROL APPARATUS FOR INTERNAL COMBUSTION ENGINE

BACKGROUND OF THE INVENTION

The present invention relates to an ignition timing control apparatus for an internal combustion engine and, particularly, to an electronic advance control apparatus.

In the operation of an internal combustion engine, it takes some time after the fuel within the cylinder has been ignited by the spark and before the cylinder pressure attains a maximum following a complete combustion of the fuel. For this reason, ignition is carried out when the piston has come to a position in advance of the top dead center, i.e., an advanced position, so that combustion will be complete when the piston comes around the top dead center for producing the maximum force.

However, as the engine speed increases over a certain high speed range, the ignition timing which has been set for the lower speed causes problems, such as the reduction in the power output and over-rotation. Therefore, for the engine speed higher than a certain high speed, the degree of advance needs to be reduced, i.e., the ignition timing needs to be delayed.

There is disclosed such an ignition control apparatus in, for example, Japanese Patent Laid-open application No. 41456/81 entitled "Magnetic Ignition Control Apparatus" filed by assignee Mitsubishi Electric Corp. on Sept. 19, 1979 and published on Apr. 18, 1981, wherein the degree of advance is reduced when the engine speed increases over a certain high speed. This apparatus, however, needs a complicated circuit arrangement for providing an ignition signal based on the pulse signal which is generated in synchronization with the rotation of the engine. In addition, the above publication does not describe clearly the purpose of reducing the degree of advance in the high speed range.

SUMMARY OF THE INVENTION

It is an object of the present invention to eliminate the above-mentioned deficiencies of the conventional ignition timing control apparatus.

Another object of the present invention is to provide a simply structured ignition timing control apparatus which is intended to prevent the reduction of the power output in the higher engine speed range.

In order to achieve these objects, the present invention provides an ignition timing control apparatus for use in an internal combustion engine comprising;

a pulse generating means which operates in synchronization with the rotation of the crank shaft of the engine and provides a first pulse at a point of time corresponding to a maximum advance angle of the engine and a second pulse at a point of time corresponding to a minimum advance angle of the engine;

a bistable circuit which makes a transition from a first state to a second state in response to the first pulse and makes a transition from the second state to the first state in response to the second pulse;

a first polygonal wave generating circuit for providing a first polygonal wave signal in response to an output of the bistable circuit, the polygonal wave output signal being at a first level when the bistable circuit is in said first state, falling to a second level when the bistable circuit makes a transition from the first state to the second state, sloping down thereafter in a first gradient with respect to time, and returning to the first level when the bistable circuit makes a transition from the second state to the first state;

a second polygonal wave generating circuit for providing a second polygonal wave signal in response to an output of the bistable circuit, the polygonal wave output signal sloping up from a fourth level in a second gradient with respect to time after the bistable circuit has made a transition from the second state to the first state, maintaining a present level when the bistable circuit provides the second state, and falling to the fourth level when the bistable circuit makes a transition from the second state to the first state;

a comparison circuit which compares the levels of the first and second polygonal wave signals and provides an ignition pulse when the level of the second polygonal wave signal reaches the level of the first polygonal wave signal; and an ignition circuit which operates on an ignition plug to perform a spark discharge in response to the second pulse from the pulse generating circuit or the ignition pulse from the comparison circuit, whereby the advance angle of the engine is substantially constant at the maximum advance angle while the engine runs in a speed range between a first predetermined engine speed and a second predetermined engine speed which is higher than the first engine speed, the advance angle decreases in proportion to the increasing engine speed while the engine runs in a speed range between the second engine speed and a third predetermined engine speed which is higher than the second engine speed, and the advance angle becomes the minimum advance angle while the engine runs at a speed higher than the third engine speed.

BRIEF DESCRIPTION OF THE DRAWINGS

FIG. 3 is a set of timing charts showing signal waveforms observed at various portions of the apparatus shown in FIG. 2.

DESCRIPTION OF THE PREFERRED EMBODIMENT

Figure 1:
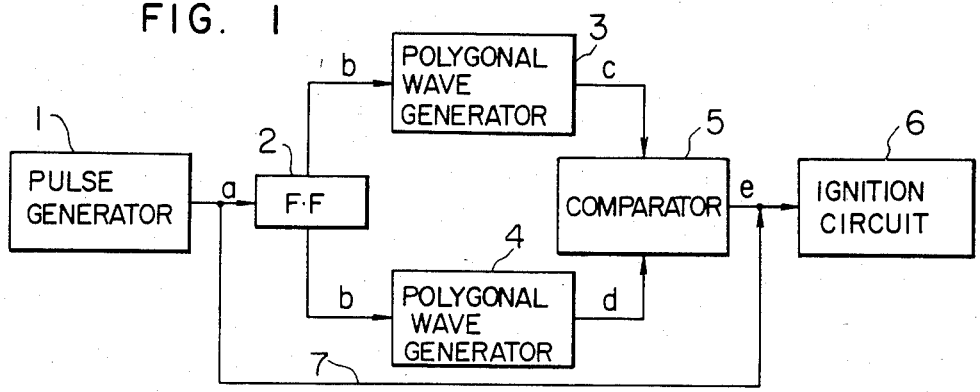
FIG. 1 is a block diagram showing the arrangement of the electronic ignition timing control apparatus according to the present invention.

FIG. 1 shows in a block diagram a preferred embodiment of the inventive ignition timing control apparatus for an internal combustion engine, and FIG. 3 shows major voltage waveforms observed at the principal portions of the apparatus shown in FIG. 1.

In FIG. 1, pulse generator 1 provides a pair of positive and negative pulses (signal a shown in FIG. 3 (A)) defining the extremes of ignition timing in synchronization with the rotation of the crank shaft, and feeds them to a bistable circuit 2, e.g., a flip-flop. The internal T of the positive and negative pulses in the signal a represents a certain crank angle difference. In response to the pair of positive and negative pulses (signal a), the flip-flop 2 provides a rectangular wave b shown in FIG. 3(C) and feeds it to the first and second polygonal wave generators 3 and 4. The first polygonal wave generator 3 provides a polygonal wave c which falls from the reference level to a certain level ml at the point of the negative pulse and further slopes down linearly with respect to time during the OFF state of the signal b, then returns to the reference level in response to the positive pulse in the signal a, as shown in FIG. 3(D). The second polygonal wave generator 4 provides a polygonal wave d which slopes up linearly with respect to time from the reference level during the ON state of the signal b and levels off at the point of the negative pulse, then falls to the reference level in response to the subsequent positive pulse in the signal a. The outputs of the polygonal wave generators 3 and 4 are fed to a comparator 5. The comparator 5 compares the two polygonal waves c and d, and provides an ignition signal e for ignition circuit 6 when the magnitude of the polygonal wave d has reached the magnitude of the polygonal wave c. The ignition circuit 6 causes an associated spark plug to make a spark discharge in response to the ignition signal e. The output pulse a from the pulse generator 1 is also fed directly through a line 7 to the ignition circuit 6, so that if the comparator 5 fails to provide an ignition signal for the ignition circuit, it is activated by the positive pulse supplied from the pulse generator 1.

In the foregoing arrangement, following the start-up of the internal combustion engine, i.e., during the idling operation (with the engine speed lower than $N_L$), the amplitude of the output pulse from the pulse generator 1 is too small to trigger the flip-flop 2, which in turn does not provide the rectangular wave b and the comparator 5 does not produce the ignition signal. Accordingly, the ignition circuit 6 is driven by the positive pulse in the pulse signal a, resulting in the minimum degree of advance which provides the latest ignition timing. Here, the degree of advance denotes a crank angle difference measured from the top dead center back to a point of ignition. As the engine speed increases to the speed range ($N_L$-$N_H$), the amplitude of the output pulse from the pulse generator 1 increases, causing the flip-flop 2 to respond and provide the rectangular wave b. The polygonal wave generators 3 and 4 provide the polygonal waves c and d, respectively, in response to the rectangular wave b. At this moment, the engine speed is still low and the peak $v_1$ of the polygonal wave d is higher than magnitude $v_2$ of the polygonal wave c as shown by waveform $d_1$ in FIG. 3(F), then at $t_1$ when the negative pulse in the pulse signal a occurs the magnitude of the polygonal wave d attains the same magnitude as that of the polygonal wave c, giving rise to an ignition signal. Thus the advance angle in this case is maximum. As the engine speed increases inside the range of $N_L$-$N_H$, the peak value of the polygonal wave d will decrease, causing the intersection p of the waves c and d to fall along the vertical section l of the polygonal wave, resulting in a substantially constant advance angle. As the engine speed further increases to the high-speed range ($N_H$-$N_{HH}$), the peak $V_2$ of the polygonal wave d will fall as shown by waveform $d_2$ in FIG. 3(F), and the wave d intersects the wave c on its sag section m, resulting in a production of the ignition signal at a slightly late timing. As the engine speed increases inside the range $N_H$-$N_{HH}$, the intersection of the waves c and d comes down along the sag section m of the polygonal wave c, resulting in a linear reduction in the advance angle. If the engine speed rises over the speed $N_{HH}$, the polygonal wave d will become as shown by waveform $d_3$ in FIG. 3(F) with its peak value $V_3$ being short of the minimum value $v_5$ of the polygonal wave c, and the comparator 5 does not provide the ignition signal. Then the ignition circuit 6 is driven by the positive pulse from the pulse generator 1, resulting in the minimum advance angle.

Figure 2:
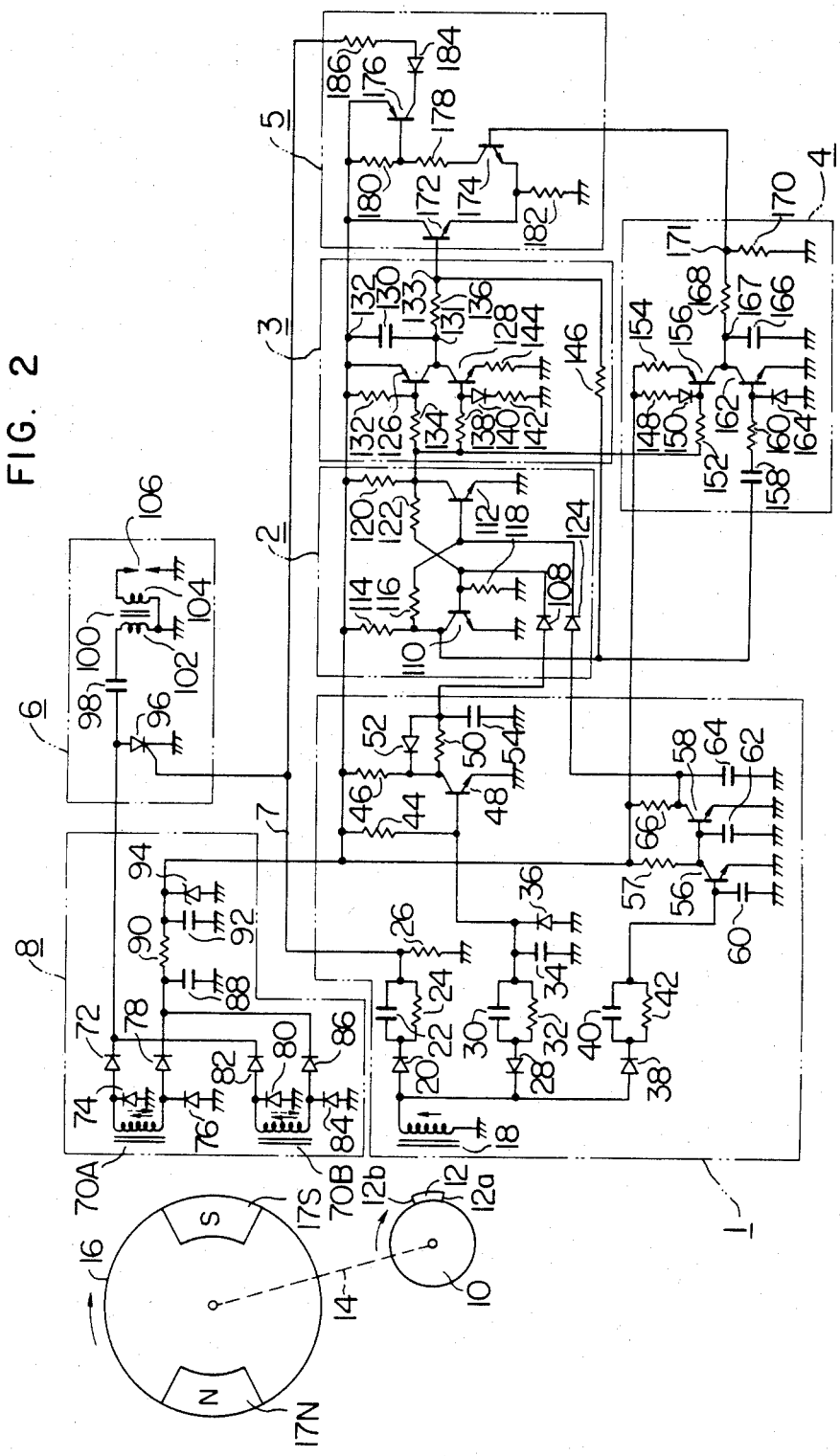
FIG. 2 is a schematic diagram showing a preferred embodiment of the electronic ignition timing control apparatus according to the present invention.

FIG. 2 shows an example of the detailed circuit arrangement for the ignition timing control apparatus shown in FIG. 1, where the present invention is applied to a single-cylinder two-stroke-cycle engine as an example. In FIG. 2, circuit blocks are given the same reference numbers as those of the corresponding blocks 1 through 6 in FIG. 1.

This embodiment employs a power unit 8 including a magneto-generator. The magneto-generator has a rotor 16, which is rotated in synchronization with the crank shaft at the same rotational speed of the engine. Around the periphery of the rotor 16, there are affixed a pair of permanent magnets 17N and 17S spaced by 180 degrees from each other. The stator of the magneto-generator has generator windings 70A and 70B, which generate induction currents having one polarity in response to the magnetic flux caused by the magnet 17N in synchronization with the rotation of the rotor 16, and the induction currents are fed through rectifiers to the ignition circuit 6 so as to be used as a power supply for ignition. The windings 70A and 70B also generate induction currents having another polarity in response to the magnetic flux caused by the magnet 17S in synchronization with the rotation of the rotor 16, and the induction currents are fed through rectifiers to other circuit blocks 1 through 5 so as to provide their common power source. The generator winding 70A has a larger number of turns so that it is used as a low-speed generator winding, while the generator winding 70B has a smaller number of turns and it is used as a high-speed generator winding. The windings 70A and 70B are arranged such that they produce induction currents in the direction shown by the solid arrows when the N-pole magnet 17N approaches each of them, while they produce induction currents in the direction shown by the dashed arrows when the S-pole magnet 17S approaches each of them. At a low engine speed, the winding 70A produces a large induction current and the winding 70B produces a small current, whereas at a high engine speed, the winding 70A produces a small current and the winding 70B produces a large current. The induction current generated by the winding 70A in the direction shown by the solid arrow is rectified by a diode 72 fed through a capacitor 98, a primary winding 102 of an ignition coil 100 and a diode 76, and the capacitor 98 is charged. The induction current generated by the winding 70B in the direction shown by the solid arrow is rectified by a diode 82, fed through the capacitor 98, the primary winding 102 of the ignition coil 100 and a diode 74, and the capacitor 98 is charged.

On the other hand, the induction currents generated by the windings 70A and 70B in the direction shown by the dashed arrows are rectified by diodes 78 and 86, respectively, and supplied through a DC voltage stabilizer made up of capacitors 88 and 92, a resistor 90 and a zener diode 94 to the pulse generator 1, the flip-flop 2, the polygonal wave generators 3 and 4, and the comparator 5, so as to be used as a DC power supply.

The pulse generator 1 has a pulsar coil 18, which generates the inductive pulse current (the pulse signal a in FIG. 2) in the direction shown by the solid arrow in synchronization with the rotation of magnet 12 affixed on disk 10 which is rotated in synchronization with the rotation of the crank shaft 14. In more detail, when the disk rotates in the direction shown by the arrow, the coil 18 generates a negative current pulse as the front edge 12a of the magnet 12 approaches the coil 18 and generates a positive current pulse as the trailing edge 12b of the magnet 12 passes by the coil 18. This signal a, made up of a pair of positive and negative pulses, is generated once every revolution of the engine. The combination of the magnet 12 and the coil 18 is arranged such that the negative pulse and the positive pulse in the pulse signal a are in correspondence to the maximum advance angular position and the minimum advance angular position, respectively, for the ignition timing. Accordingly, the interval of a continuous positive and negative pulses in the pulse signal a represents the difference between the maximum and minimum advance angular positions, and the interval in time will decrease as the engine speed rises.

Figure 5:
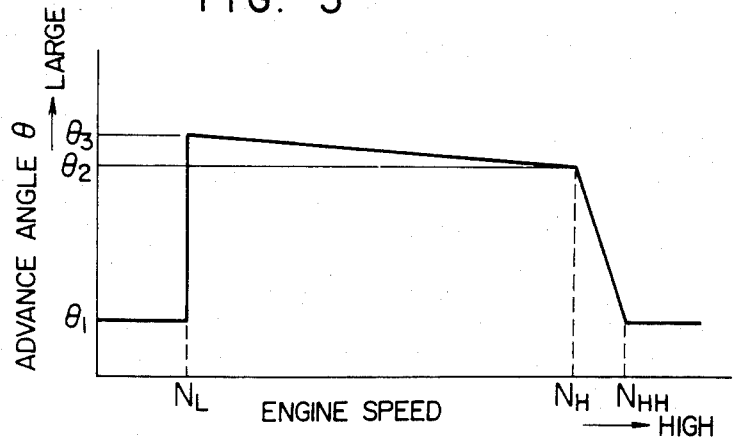
FIG. 5 is a graphical representation showing the relationship between the degree of advance and the engine speed achieved by the apparatus shown in FIG. 2.

The following will describe the operation of the pulse generator 1, the flip-flop 2, the polygonal wave generators 3 and 4, the comparator 5, and the ignition circuit 6, with reference to FIGS. 2 and 5.

First, the engine speed is assumed to be lower than the predetermined low speed $N_L$, e.g., the normal idling speed. When the pulsar coil 18 generates a negative pulse as part of the output pulse signal a, it is fed through the self-bias circuit consisting of a diode 18, a capacitor 30, a resistor 32, a capacitor 34 and a diode 36 to the base of a transistor 48, which has been conductive due to the forward bias by the voltage from the power unit 8 through a resistor 44, then the base voltage will fall. The pulse signal a has an amplitude which is substantially proportional to the engine speed, and thus the negative pulse at an engine speed of lower than $N_L$ has a small amplitude. Accordingly, the negative pulse is merely effective on the transistor 48 to slightly lower its base voltage, and the transistor 48 remains conductive. The value of the resistor 44 is chosen so that the base of the transistor 48 is biased to such a degree that the negative pulse brings the transistor 48 conductive when the engine speed is at least as high as $N_L$.

Figure 4:
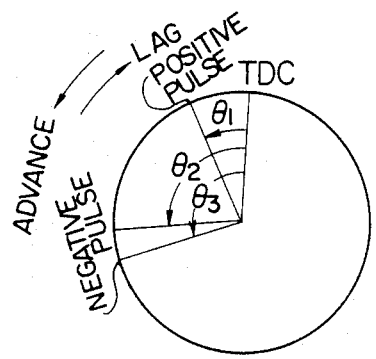
FIG. 4 is a diagram depicting the timing of ignition provided by the apparatus shown in FIG. 2.

Similarly, when the pulsar coil 18 generates a positive pulse, it is fed through the self-bias circuit consisting of a diode 38, capacitors 40 and 60, and a resistor 42 to the base of a transistor 56. In this case, since the transistor 48 is conductive, the collector voltage thereof is low level and so the transistor 110 of the flip-flop 2 biased by the collector voltage of the transistor 48 is non-conductive and the transistor 112 is conductive. The transistor 56 becomes conductive in response to the positive pulse to thereby turn off the transistor 58. Thus, the high level output of the transistor 58 is applied to the base of the transistor 112. However, since the transistor 112 is in a conductive state, it maintains its conductive state. Thus, the flip-flop 2 provides no pulse output, and consequently, the comparator 5 does not produce the ignition signal e. On the other hand, the pulsar coil 18 supplies a positive pulse through the self-bias circuit consisting of a diode 20, a capacitor 22 and a resistor 24, and through a line 7 to the gate of a thyristor 96 in the ignition circuit 6. Accordingly, when the engine speed is lower than $N_L$, this positive pulse turns on the thyristor 96 so as to discharge the capacitor 98 through the primary winding 102 of the ignition coil 100. Then a high voltage is induced across the secondary winding 104, giving rise to a spark discharge across the gap of the ignition plug 106. In this case, ignition is timed to the positive pulse in the pulse signal a, that occurs at the minimum advance angular position as shown in FIG. 4.

When the engine speed increases slightly over $N_L$, the pulsar coil 18 provides the pulse signal a with an increase amplitude. Then the negative pulse in the pulse signal a causes the base bias for the transistor 48 to become slightly lower than the minimum voltage necessary to keep the transistor conductive, and the transistor 48 is cut off. Then the collector voltage of the transistor 48 goes high, and the collector current of the transistor 48 supplied from the power unit 8 through the resistor 46 is switched to the integrating circuit made up of a resistor 50 and a capacitor 54. The output of the integrating circuit is fed through diode 108 to the base of a transistor 110 in the flip-flop 2, causing the transistor 110 to become conductive and at the same time transistor 112 to be cut off. When the negative pulse in the pulse signal a goes off, the transistor 48 becomes conductive again and the capacitor 54 is quickly discharged through diode 52. At this time, the transistors 110 and 112 constituting the flip-flop 2 do not change operating states.

When the pulsar coil 18 generates a positive pulse, the transistor 56 becomes conductive and then the transistor 58 is cut off. Then the collector voltage of the transistor 58 goes high, causing the current from the power unit 8 to be supplied to the integrating circuit made up a resistor 66 and a capacitor 64. The output of the integrating circuit is fed through a diode 124 in the flip-flop 2 to the base of the transistor 112, then the transistor 112 is made conductive and at the same time the transistor 110 is cut off. When the positive pulse in the pulse signal a goes off, the transistors 56 and 58 return to the non-conductive and conductive states, respectively, and the capacitor 64 is discharged quickly through the collector and emitter of the transistor 58. At this time, the transistors 110 and 112 of the flip-flop 2 do not charge their operating states.

Thus in the flip-flop 2, the transistor 110 is conductive during the period after the pulsar coil 18 has issued a negative pulse and until it provides a positive pulse, and conversely, the transistor 112 is conductive during the period following a positive pulse until a negative pulse is given.

The flip-flop 2 provides, at the collector of the transistor 112, one rectangular wave signal b (FIG. 3(C)) for the first and second polygonal wave generators 3, and 4, while providing at the collector of the transistor 110 another rectangular wave signal b' (FIG. 3(B)) with the opposite polarity relative to the signal b for the second polygonal wave generator 4.

The first polygonal wave generator 3 includes a pair of PNP and NPN transistors 126 and 128 and a capacitor 130. The PNP transistor 126 has its base connected through resistor 134 to the collector of the transistor 112, while the base of the NPN transistor 128 is connected through resistor 138 to the collector of the transistor 112. The collectors of the transistors 126 and 128 are commonly connected through resistors 136 and 146 to the collector of the transistor 110, and also through the resistor 136 to the base of a transistor 172 in the comparator 5. The collector and emitter of the transistor 126 are connected through a capacitor 130.

In the foregoing arrangement of the first polygonal wave generator 3, while the transistor 112 is conductive (e.g., during the period from $t_2$ to $t_3$), the low collector voltage of the transistor 112 makes the transistor 126 conductive and the transistor 128 non-conductive. Accordingly, the collector voltage of the transistor 126, i.e., the voltage at one side 131 of the capacitor 130, is equal to the supply voltage from the power unit 8, and the output voltage of the circuit 3 at a node 133 of the resistors 136 and 146 stays at high level $v_1$. Subsequently, when the transistor 112 is cut off at $t_3$, for example, the transistor 126 becomes non-conductive and the transistor 128 conductive. At the same time, the transistor 110 also becomes conductive. Consequently, the collector current of the transistor 126 supplied from the power unit 8 is switched to flow through the capacitor 130, the collector and emitter of the transistor 128 and a resistor 144, and also through the resistors 136 and 146 to the transistor 110. Accordingly, conduction of the transistor 128 at $t_3$ causes the voltage at the node 133 to fall from $v_1$ to $v_2$. The voltage $v_2$ is determined by the value of the resistor 146, and the larger the resistor 146, the higher voltage will result for $v_2$. At $t_3$, the capacitor 130 is charged by the current supplied from the power unit 8 through a node 132, and the voltage at the node 131 will fall gradually at a rate determined by the time constant of the circuit. Consequently, the voltage at the node 133 will slope down from the level $v_2$ at a certain rate with respect to time starting at $t_3$ as shown in FIG. 3(D). In a short while when the transistor 112 turns on again, causing the transistors 126 and 128 to become conductive and non-conductive, respectively, the collector voltage of the transistor 128 goes up to the supply voltage, and the voltage at the node 133 returns to $v_1$. Thus the first triangular wave generator 4 provides at the node 133 a polygonal wave c as shown in FIG. 3(D) and supplies it to the base of the transistor 172. It should be noted that the polygonal wave c is superimposed on a DC voltage determined by the resistor 146. The lowest level ($v_3$, $v_4$ and $v_5$) in the sag section m of the polygonal wave c will fall deeper as the cut off period of the transistor 112 increases. Accordingly, as the engine speed increases, the cut off period of the transistor 112 will decrease, and thus the lowest level of the signal c will be lifted. The voltage levels $v_1$ and $v_2$ and the gradient of the sag section m are constant irrespective of the engine speed. The gradient of the sag section m can be set arbitrarily by choosing the values of the capacitor 130 and the resistors 136, 144 and 146 properly.

The second polygonal wave generator 4 includes the differentiation circuit made up of PNP and NPN transistors 156 and 162, a capacitor 158 and a resistor 160, and the integrating circuit made up of a capacitor 166 and resistors 168 and 170. The base of the PNP transistor 156 is connected through resistor 152 to the collector of the transistor 112, while the base of the NPN transistor 162 is connected through the resistor 160 and capacitor 158 to the collector of the transistor 110.

In this arrangement, while the transistor 112 is cut off (e.g., during the period from $t_2$ to $t_3$), the transistor 156 is conductive and the transistor 162 is non-conductive, causing the capacitor 166 to be charged by the current supplied from the power unit 8 through the resistor 154 and the emitter and collector of the transistor 156 in accordance with the time constant determined by the capacitor 166 and resistors 154, 168 and 170. Consequently, the voltage at one side 167 of the capacitor 166 will rise at a certain rate with respect to time following time $t_2$. When the transistor 112 is cut off at $t_3$, the transistor 156 is also cut off. Then the charging current to the capacitor 166 is interrupted and the rising of the voltage at a node 171 of the resistors 168 and 170 will cease. At this moment, the transistor 110 turns on, applying a negative pulse through the differentiation circuit to the base of the transistor 162, but of course the transistor 162 remains cut off. Accordingly, the capacitor 166 holds the charge and the voltage at a node 171 stays the peak level $v_2$. In a short while at $t_5$, the transistor 112 turns on again and the transistor 110 is cut off, the latter applying a positive pulse to the base of the transistor 162 through the differentiation circuit made up of the capacitor 158 and the resistor 160, causing the transistor 162 to become conductive momentarily. Then, the capacitor 166 is discharged quickly through the transistor 162 and the voltage at the node 171 falls to zero. Lmmediately following that event, the capacitor 166 starts to be charged by the current from the power unit. The polygonal wave d thus produced by the second polygonal wave generator 4 is applied to the base of the transistor 174 in the comparator 5. The peak voltage ($v_1$, $v_2$ and $v_3$) of the polygonal wave d is proportional to the ON period of the transistor 112. Accordingly, as the engine speed rises, the ON period of the transistor 112 will decrease, and thus the peak voltage will fall. The slope of the sag section of the polygonal wave d can be set arbitrarily by choosing the values of the capacitor 166 and resistors 154, 168 and 170 properly.

The comparator 5 includes NPN transistors 172 and 174 for comparing the input signal levels and a PNP transistor 176 for output. The emitters of the transistors 172 and 174 are commonly grounded through a resistor 182, and the collector of the transistor 176 is connected through a diode 184 and a resistor 186 to the ignition circuit 6. The bases of the transistors 172 and 174 are connected to receive the polygonal waves c and d from the first and second polygonal wave generators 3 and 4, respectively. If the base voltage of the transistor 172 is higher than that of the transistor 174, the former is conductive and the latter is non-conductive, causing the transistor 176 to be non-conductive due to its high base voltage, and the circuit 5 does not provide the ignition signal e. On the other hand, if the base voltage of the transistor 172 is lower than that of 174, the former is non-conductive and the latter is conductive, causing the transistor 176 to be conductive, and the ignition signal e sent out through the diode 184 and resistor 186 is delivered to the gate of the thyristor 96 in the ignition circuit 6. That is, as shown in FIG. 3(F), when the magnitude of the polygonal wave d attains to that of the polygonal wave c at $t_1$, for example, the transistors 174 and 176 become conductive and the ignition signal e is produced.

The following will describe the operation responsive to the engine speed of the ignition timing control apparatus shown in FIG. 2 with reference to FIGS. 3 and 5.

First, when the engine speed is lower than the predetermined low speed, e.g., the normal idling speed, the flip-flop 2 does not operate, as described previously, and the thyristor 96 in the ignition circuit 6 is turned on for ignition by the positive pulse derived from the pulse generator 1. Then, the advance angle $\theta$ (the difference of crank angles measured from the top dead center back to the point of ignition) is the minimum value $\theta_1$ as shown in FIGS. 4 and 5. The low engine speed $N_L$ can be set arbitrarily by the adjustment of the resistor 44.

When the engine speed rises over $N_L$ to a certain speed range, the transistors 56 and 48 are activated by the positive and negative pulses in the pulse signal a, and the flip-flop 2 operates. Then the first and second polygonal wave generators 3 and 4 provide the polygonal waves c and d, respectively. Then, the polygonal waves c and d have respective waveforms $c_1$ and $d_1$ in the relationship shown in FIG. 3(F). With the engine speed between $N_L$ and $N_H$, the polygonal wave $d_1$ has the peak $V_1$ between levels $v_1$ and $v_2$ of the polygonal wave $c_1$. As the engine speed increases inside the range from $N_L$ to $N_H$, the intersection p of the waves $c_1$ and $d_1$ falls along the vertical section l, and will come to $v_2$ when the engine speed reaches $N_H$. The engine speed $N_H$ at which the intersection p coincides with $v_2$ can be set arbitrarily by adjusting the level $v_2$ by choosing the value of the resistor 146 in the polygonal wave generator 3, and/or by adjusting the gradient of the polygonal wave d by choosing the values of the resistors 154, 167 and 170 and the capacitor 166. The engine speed $N_H$ can be set higher by lowering the level $v_2$ by choosing a smaller value for the resistor 146. Thus the polygonal wave $d_1$ reaches the level of the wave $c_1$ at $t_1$, causing the transistor 174 in the comparator 5 to become conductive, and the ignition signal e is produced for ignition. The advance angle at this time ranges from a maximum of $\theta_3$ to $\theta_2$ as shown in FIG. 4. That is, as the engine speed increases from $N_L$ to $N_H$, the advance angle will decrease gradually from the maximum value $\theta_3$. This operation will further be described in connection with FIG. 6.

Figure 6:
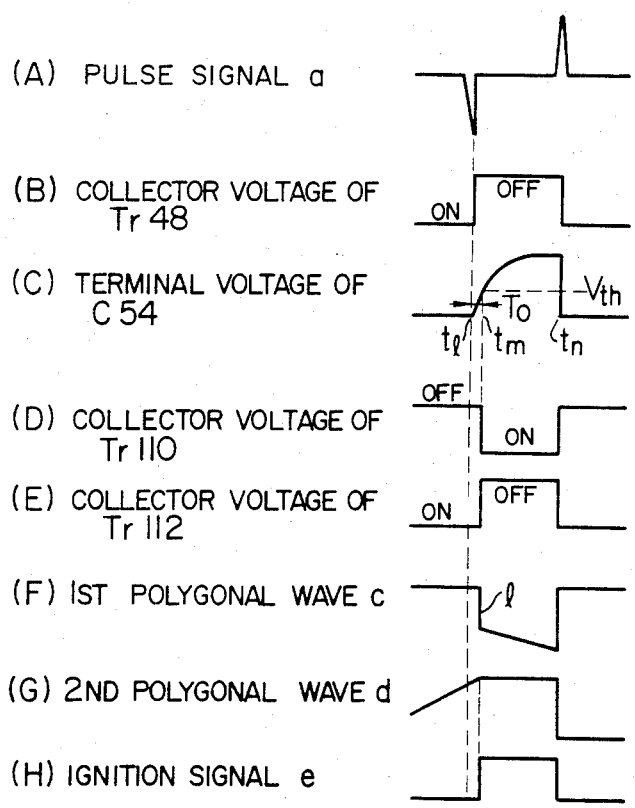
FIG. 6 is a set of signal waveform charts explaining the operation of the apparatus shown in FIG. 2.

First, when a negative pulse in the pulse signal a occurs at $t_l$, the transistor 48 goes off, with its high collector voltage charging the capacitor 54 through the resistors 46 and 50 in accordance with the time constant determined by the capacitor 54 and resistors 44 and 50. Then the voltage across the capacitor 54 will rise as shown in FIG. 6(C), and this voltage is applied through the diode 108 to the base of the transistor 110. Assuming the threshold base voltage for the transistor 110 to be $V_{th}$, the capacitor voltage will reach the threshold level $V_{th}$ at time $t_m$, bringing the transistor 110 conductive and the transistor 112 non-conductive. Consequently, as shown in FIG. 6(F, G), the falling transition l of the first polygonal wave occurs at $t_m$ and the second polygonal wave d levels off at $t_m$. Then the ignition signal e is produced at $t_m$. Thus the ignition signal e is issued on expiration of a certain time interval $T_0$ ($T_0 = t_m - t_l$) determined from the charging time constant for the capacitor 54 and the threshold level $V_{th}$ of the transistor 110 following the occurrence of a negative pulse in the pulse signal a. The time interval $T_0$ is constant irrespective of the engine speed. Accordingly, the higher the engine speed, the larger will be the angular difference from the crank position where the negative pulse has occurred to the crank position where the ignition signal e is produced. In other words, as the engine speed gains, the crank position at which the ignition signal e is produced will occur much later relative to the crank position at which the negative pulse is generated. As shown in FIGS. 4 and 5, the advance angle is maximum at $\theta_3$ when the engine speed is $N_L$, and the advance angle decreases as the engine speed goes up, and the advance angle becomes $\theta_2$ at speed $N_H$. It should be noted that even if a positive pulse in the pulse signal a is applied to the thyristor 96 immediately after it has been turned on by the ignition signal e, causing the thyristor 96 to be triggered again, the recurrent spark discharge does not affect the engine since the fuel within the cylinder has already combusted.

When the engine speed has reached $N_H$, the peak of the polygonal wave d falls to level $v_2$ of the polygonal wave c, and as the engine speed further increases, the peak of the wave d further goes down, then when the engine speed reaches $N_{HH}$, the peak level comes to the lowest level of the sag section m of the polygonal wave c. Accordingly, within the speed range of $N_H$–$N_{HH}$ the point of time at which the peak of the wave d reaches the level of the wave c will lag in proportion to the increase in the engine speed. That is, as shown by the polygonal waves $c_1$ and $d_2$ in FIG. 3(F), the intersection p of the waves c and d goes down along the sag section m of the wave c as the engine speed increases inside the range of $N_H$–$N_{HH}$. Consequently, the timing of the ignition signal e is delayed as the engine speed increases from $N_H$ to $N_{HH}$, causing the advance angle, which has been $\theta_2$ at speed $N_H$, to decrease linearly with respect to the increasing engine speed down to the minimum value $\theta_1$ at speed $N_{HH}$. The engine speed $N_H$ at which the advance angle begins to fall sharply with respect to the engine speed is determined from level $v_2$ of the polygonal wave c and/or the peak level of the wave d as mentioned previously, and thus it is adjusted by choosing the value of the resistor 146 in the polygonal wave generator 3 and/or the values of the resistors 154, 167 and 170 and capacitor 166 in the polygonal wave generator 4. The speed range $N_H$–$N_{HH}$ can be changed by adjusting the slope of the polygonal wave d. The rate of variation in the advance angle with respect to the engine speed is determined from the gradient of the slope m of the polygonal wave c.

When the engine speed exceeds $N_{HH}$, the peak of the polygonal wave d does not reach the minimum level of the wave c as shown by waves $c_3$ and $d_3$ in FIG. 3(F), causing the transistor 174 in the comparator 5 to keep the cut off state, and the ignition signal e is not produced. In this case, the ignition circuit responds to the positive pulse in the pulse signal a, resulting in the minimum advance angle $\theta_1$. The advance angle also takes $\theta_1$ when the engine speed is higher than $N_{HH}$. The speed $N_{HH}$ is determined from the minimum level of the polygonal wave c and/or the peak level of the wave d, and it can be set arbitrarily by adjusting the gradient of the slope m of the wave c and/or the gradient of the slop of the wave d.

According to the present invention, the simply structured ignition timing control appratus is capable of controlling the ignition timing stably which the internal combustion engine requests depending on its rotational speed, thereby enhancing the power output of the engine. In particular, in the higher speed range over a certain speed which can be set arbitrarily, the advance angle is made smaller in proportion to the increasing engine speed and the high-speed torque performance of the engine can be upgraded. In addition, the engine can be prevented from over-rotation in the high-speed range.

Although the foregoing embodiment has been described for the ignition apparatus using a magneto-generator for the ignition power source, it will be appreciated that the present invention can be applied directly to a transistorized ignition apparatus using an ignition power source of the current interruption type.

The embodiment illustrated in FIG. 2 is the apparatus used for a single-cylinder two-stroke-cycle engine, however, the present invention can of course be applied to a single-cylinder four-stroke-cycle engine, a multi-cylinder two-stroke-cycle engine, and a multi-cylinder four-stroke-cycle engine. A multi-cylinder two-stroke-cycle engine can be cohtrolled by provision of the arrangement of FIG. 2 for each cylinder independently, or by providing a number of magnet pairs 17S and 17N on the rotor 16 and a number of magnets 12 on the disk 10 equal to the number of cylinders, with a distributor being used for supplying individual ignition signal e to each cylinder.

We claim:

1. An ignition timing control apparatus for use in an internal combustion engine comprising:

pulse generating means which operates in synchronization with the rotation of the crank shaft of the engine for providing a first pulse at a point of time corresponding to a maximum advance angle of said engine and a second pulse at a point of time corresponding to a minimum advance angle of said engine;

a bistable circuit connected to said pulse generating means for producing an output having a transition from a first state to a second state in response to said first pulse and a transition from said second state to said first state in response to said second pulse;

first polygonal wave generating means for providing a first polygonal wave signal in response to the output of said bistable circuit, said first polygonal wave signal being at a first level when said bistable circuit is in said first state, falling to a second level when said bistable circuit makes a transition from the first state to the second state, sloping down thereafter in a first gradient with respect to time, and returning to the first level when said bistable circuit makes a transition from the second state to the first state;

second polygonal wave generating means for providing a second polygonal wave signal in response to the output of said bistable circuit, said second polygonal wave signal sloping up from a fourth level in a second gradient with respect to time after said bistable circuit has made a transition from the second state to the first state, maintaining a present level when said bistable circuit is in the second state, and falling to the fourth level when said bistable circuit makes a transition from the second state to the first state;

a comparison circuit which compares the levels of said first and second polygonal wave signals and provides an ignition pulse when the level of said second polygonal wave signal reaches the level of said first polygonal wave signal; and an ignition circuit which operates to perform a spark discharge in response to said second pulse from said pulse generating means or said ignition pulse from said comparison circuit, whereby the advance angle of said engine is substantially constant at said maximum advance angle while said engine runs in a speed range between a first predetermined engine speed and a second predetermined engine speed which is higher than said first engine speed, the advance angle decreases in proportion to the increasing engine speed while said engine runs is a speed range between said second engine speed and a third predetermined engine speed which is higher than said second engine speed, and the advance angle runs at a speed higher than said third engine speed.

2. An ignition timing control apparatus according to claim 1, wherein said second engine speed is determined depending on said second level of said first polygonal wave signal and said third engine speed is determined depending on said first gradient of the slope of said first polygonal wave signal.

3. An ignition trming control apparatus according to claim 1, wherein said bistable circuit receives said second pulse from said pulse generating circuit through an integrating circuit, so that said bistable circuit makes a transition from the second state to the first state upon expiration of a predetermined time after said bistable circuit has received said second pulse.

4. An ignition timing control apparatus according to claim 1, wherein said first polygonal wave generating circuit comprises a direct current (DC) bias circuit, said second level of said first polygonal wave signal being determined by a DC bias provided by said bias circuit.

5. An ignition timing control appratus according to claim 1, wherein said second polygonal wave generating circuit comprises means including a charging and discharging circuit for performing a discharge immediately after said bistable circuit has made a transition from the second to the first state, thereafter starting a charge, and halting the charging when said bistable circuit returns to the second state, thereby providing said second polygonal wave output signal.

* * * * *